(12) United States Patent
Kim

(10) Patent No.: US 8,856,510 B2
(45) Date of Patent: Oct. 7, 2014

(54) METHOD FOR JOINING USER DOMAIN AND METHOD FOR EXCHANGING INFORMATION IN USER DOMAIN

(75) Inventor: Gun-wook Kim, Goyang-si (KR)

(73) Assignee: Pantech Co., Ltd., Seoul (KR)

( * ) Notice: Subject to any disclaimer, the term of this patent is extended or adjusted under 35 U.S.C. 154(b) by 1030 days.

(21) Appl. No.: 12/334,825

(22) Filed: Dec. 15, 2008

(65) Prior Publication Data

US 2009/0198993 A1    Aug. 6, 2009

(30) Foreign Application Priority Data

Jan. 31, 2008   (KR) ........................ 10-2008-0010232

(51) Int. Cl.
| | |
|---|---|
| *H04L 29/06* | (2006.01) |
| *H04L 9/32* | (2006.01) |
| *H04L 9/28* | (2006.01) |
| *H04L 9/08* | (2006.01) |
| *G06F 7/04* | (2006.01) |
| *G06F 17/30* | (2006.01) |
| *H04N 7/16* | (2011.01) |
| *G06F 21/10* | (2013.01) |

(52) U.S. Cl.
CPC ...................... *G06F 21/10* (2013.01)
USPC ........... 713/153; 713/161; 713/169; 713/170; 713/171; 380/28; 380/278; 726/29

(58) Field of Classification Search
USPC ........................................................ 713/153
See application file for complete search history.

(56) References Cited

U.S. PATENT DOCUMENTS

| | | | | |
|---|---|---|---|---|
| 4,956,863 | A | * | 9/1990 | Goss ............................... 380/30 |
| 5,604,807 | A | * | 2/1997 | Yamaguchi et al. .......... 380/259 |
| 6,084,969 | A | * | 7/2000 | Wright et al. .................. 380/271 |
| 6,118,873 | A | * | 9/2000 | Lotspiech et al. ............. 380/277 |
| 6,131,090 | A | * | 10/2000 | Basso et al. ..................... 706/23 |
| 6,377,691 | B1 | * | 4/2002 | Swift et al. ..................... 380/277 |
| 6,628,786 | B1 | * | 9/2003 | Dole ............................... 380/44 |
| 6,636,968 | B1 | * | 10/2003 | Rosner et al. ................. 713/178 |
| 7,055,030 | B2 | * | 5/2006 | Negawa ........................ 713/163 |

(Continued)

FOREIGN PATENT DOCUMENTS

| | | |
|---|---|---|
| KR | 10-2007-0117422 | 12/2007 |
| KR | 10-2008-0009519 | 1/2008 |
| KR | 1020080001508 | 1/2008 |

OTHER PUBLICATIONS

"Local Rights Manager for Secure Content Exchange", Open Mobile Alliance, Draft Version 1.0 dated Dec. 21, 2007, OMA-TS-SCE_LRM-V1_0-20071221-D.

(Continued)

*Primary Examiner* — Carolyn B Kosowski
(74) *Attorney, Agent, or Firm* — H.C. Park & Associates, PLC

(57) ABSTRACT

A method for joining a user domain based on digital right management (DRM), a method for exchanging information between a user device and a domain enforcement agent, and a method for exchanging information between user devices belonging to the same user domain include sharing a domain session key between the user device and the domain enforcement agent or between the user devices belonging to the same user domain. Information is exchanged through a secure session set up between the user device and domain enforcement agent or between the user devices, and information exchange occurs through encryption/decryption using the domain session key.

13 Claims, 7 Drawing Sheets

(56) References Cited

U.S. PATENT DOCUMENTS

| | | | |
|---|---|---|---|
| 7,466,824 B2* | 12/2008 | Dobranski et al. | 380/260 |
| 7,568,234 B2* | 7/2009 | Naslund et al. | 726/26 |
| 7,630,940 B2* | 12/2009 | Watanabe et al. | 705/52 |
| 7,644,275 B2* | 1/2010 | Mowers et al. | 713/168 |
| 7,769,177 B2* | 8/2010 | Son et al. | 380/281 |
| 7,845,011 B2* | 11/2010 | Hirai | 726/26 |
| 7,882,291 B2* | 2/2011 | Oh et al. | 710/118 |
| 7,885,412 B2* | 2/2011 | DeRobertis et al. | 380/279 |
| 7,917,946 B2* | 3/2011 | Lindholm et al. | 726/14 |
| 7,996,335 B2* | 8/2011 | Shirai et al. | 705/51 |
| 8,200,963 B2* | 6/2012 | Jin et al. | 713/163 |
| 8,209,535 B2* | 6/2012 | Lee et al. | 713/169 |
| 8,483,394 B2* | 7/2013 | Nordholt et al. | 380/279 |
| 8,687,800 B2* | 4/2014 | Patel | 380/28 |
| 2003/0016819 A1* | 1/2003 | Cheng | 380/2 |
| 2005/0100165 A1* | 5/2005 | Rose et al. | 380/270 |
| 2005/0102513 A1* | 5/2005 | Alve | 713/168 |
| 2005/0154889 A1* | 7/2005 | Ashley et al. | 713/171 |
| 2007/0180497 A1* | 8/2007 | Popescu et al. | 726/4 |
| 2007/0220610 A1* | 9/2007 | Van Loenen et al. | 726/26 |
| 2008/0046271 A1 | 2/2008 | Jeong et al. | |
| 2008/0098481 A1* | 4/2008 | Lee et al. | 726/26 |
| 2008/0114687 A1* | 5/2008 | Watanabe et al. | 705/51 |
| 2008/0184350 A1* | 7/2008 | Chu | 726/7 |
| 2009/0025078 A1* | 1/2009 | Kuehr-McLaren et al. | 726/14 |
| 2009/0287922 A1* | 11/2009 | Herwono et al. | 713/155 |
| 2010/0042840 A1* | 2/2010 | Watanabe et al. | 713/169 |
| 2010/0100953 A1* | 4/2010 | Mowers et al. | 726/10 |
| 2010/0257356 A1* | 10/2010 | Greevenbosch et al. | 713/155 |
| 2013/0083926 A1* | 4/2013 | Hughes et al. | 380/278 |

OTHER PUBLICATIONS

EPO Extended Search Report dated Dec. 23, 2009, for Application No. EP 08022153.4.

Open Mobile Alliance, "OMA DRM Requirements", Draft Version 2.1—Sep. 25, 2006.

Open Mobile Alliance, "Secure Content Exchange Requirements", Draft Version 1.0—Sep. 21, 2006.

Goro Kunito, et al., "A Study of Tracking Agent for a Multiple-Mobile-Agent Environment", Institute of Electronics, Information and Communication Engineers (IEICE) Technical Report, Apr. 21, 1997, pp. 1-8.

* cited by examiner

METHOD FOR JOINING USER DOMAIN AND METHOD FOR EXCHANGING INFORMATION IN USER DOMAIN

CROSS-REFERENCE TO RELATED APPLICATION

This application claims priority from and the benefit of Korean Patent Application No. 10-2008-0010232, filed on Jan. 31, 2008, which is hereby incorporated by reference for all purposes as if fully set forth herein.

BACKGROUND OF THE INVENTION

1. Field of the Invention

The following description relates to digital rights management (DRM), and more particularly, to a method for joining a user domain based on DRM, and a method for exchanging information in the user domain.

2. Discussion of the Background

The Open Mobile Alliance (OMA), which is a standards group for the technology of mobile software application elements, has studied the standard of 'OMA DRM extension for Secure Content Exchange' (hereinafter, referred to as OMA DRM SCE), which is an extended version of the existing OMA DRM Version 2.0.

The OMA DRM SCE defines a method for allowing a user device to join a user domain through a domain enforcement agent (hereinafter, referred to as DEA), instead of through a rights issuer (RI).

FIG. 1 is a diagram illustrating a method for joining a user domain based on the OMA DRM Version 2.0.

FIG. 1 shows a 2-pass join domain protocol for allowing a user device compatible with the OMA DRM Version 2.0 to use a domain rights object (RO). This protocol is also described in U.S. patent application Ser. No. 11/841,190.

As illustrated in FIG. 1, the user device issues a request to a rights issuer for joining a user domain using the 2-pass domain join protocol. The rights issuer requests an Online Certificate Status Protocol (OCSP) responder to send information regarding the status of a certification of the user device. If information regarding the status of the certification of the user device is received, the rights issuer transmits a response to the user domain join request to the corresponding user device.

If the status of the certification is "good", this means that the certification is available. If the status of the certification is "revoked", this means that the certification has been revoked permanently or is temporarily unavailable. If the status of the certification is "unknown", this means that information about the certification is unknown.

The rights issuer determines whether to allow the user device to join the user domain based on the status of the certification, and transmits a response to the user device according to the result of the determination. Through the user domain join procedure described above, the user device can use the domain rights object.

FIG. 2 is a diagram illustrating a method for allowing multiple user devices compatible with the OMA DRM Version 2.0 to use a domain rights object.

Referring to FIG. 2, user devices D1, D2 and D3 are registered with a rights issuer using a 4-pass registration protocol, and join a specific user domain using a 2-pass join domain protocol.

Then, the user device D1 acquires a rights object, including content and rights, from the rights issuer using a 2-pass rights object acquisition protocol, and transmits the rights object to the user devices D2 and D3 belonging to the same user domain as the user device D1. Accordingly, the user devices D2 and D3 can also use the rights object.

Meanwhile, to allow another user device D4 which has not joined the user domain to use the rights object transmitted to the user device D4 by the user device D1, the user device D4 should be registered with the rights issuer using the 4-pass registration protocol, and join the user domain using the 2-pass join domain protocol.

Meanwhile, according to the OMA DRM SCE (see FIG. 1 and FIG. 2) which is an extended version of existing OMA DRM Version 2.0, each user device can join a user domain through a domain enforcement agent (DEA) instead of a rights issuer.

However, if a user device joins a user domain using the 2-pass join domain protocol defined in the OMA DRM SCE, the following problems may occur.

First, if many user devices belonging to the same user domain perform security communications, authorization should be performed and a shared key should be set up between the user devices. However, if security communications are based on an existing authentication method such as OCSP, a large load may be applied to the user devices, and the communications security of members belonging to the same user domain may not be ensured.

Also, since information shared by two user devices is a domain rights object, and a domain key stored in the domain rights object is known to all members belonging to the same user domain, communications security may be difficult when encryption for communications between the two user devices is performed using the domain key.

Second, if security communications are performed between a user device and a DEA, since the user device and the DEA share no key information, there is the above-described problem that a new security session should be set up using an existing authentication method for encryption communications between the user device and the DEA.

SUMMARY OF THE INVENTION

This invention provides a method for joining a user domain based on digital rights management, in which a domain session key is exchanged between a user device and a DEA so that a more secure session is set up for information exchange.

This invention also provides a method for exchanging information between a user device and a domain enforcement agent based on digital rights management, in which information to be transmitted between the user device and domain enforcement agent is encrypted using a domain session key shared by the user device and the domain enforcement agent.

This invention also provides a method for exchanging information between two user devices in the same user domain based on digital rights management, in which information to be transmitted between the user devices is encrypted using a specific domain session key issued only to the user devices.

Additional features of the invention will be set forth in the description which follows, and in part will be apparent from the description, or may be learned by practice of the invention.

This invention discloses a method for joining a user domain based on digital rights management (DRM), including in a user device, transmitting a domain join request message including a first domain session key to a domain enforcement agent managing the user domain, and receiving a domain join response message from the domain enforcement agent in response to the domain join request message, the domain join response message including a second domain session key.

This invention also discloses a method for exchanging information between a user device and a domain enforcement agent based on digital rights management (DRM), including encrypting information using a domain session key shared by the user device and the domain enforcement agent, and transmitting the encrypted information, and receiving the encrypted information and decrypting the encrypted information using the domain session key shared by the user device and the domain enforcement agent.

This invention also discloses a method for exchanging information between a first user device and a second user device based on digital rights management (DRM), including in the first user device, designating the second user device with which to exchange information, and requesting a domain enforcement agent to send a new domain session key, in the domain enforcement agent, generating the new domain session key for information exchange between the first user device and the second user device, and transmitting the new domain session key to the first user device and the second user device, and in the first user device and the second user device, receiving the new domain session key from the domain enforcement agent, and exchanging information using the new domain session key.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF THE ILLUSTRATED EMBODIMENTS

Figure 1:
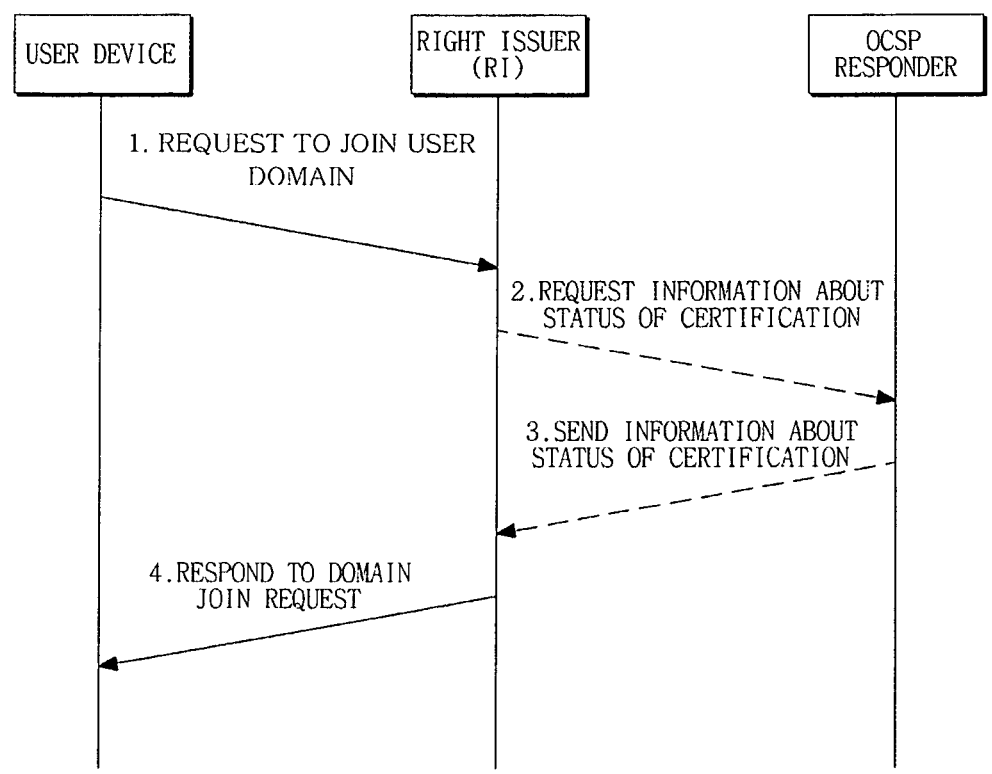
FIG. 1 is a diagram illustrating a method for joining a user domain based on OMA DRM Version 2.0.
Figure 2:
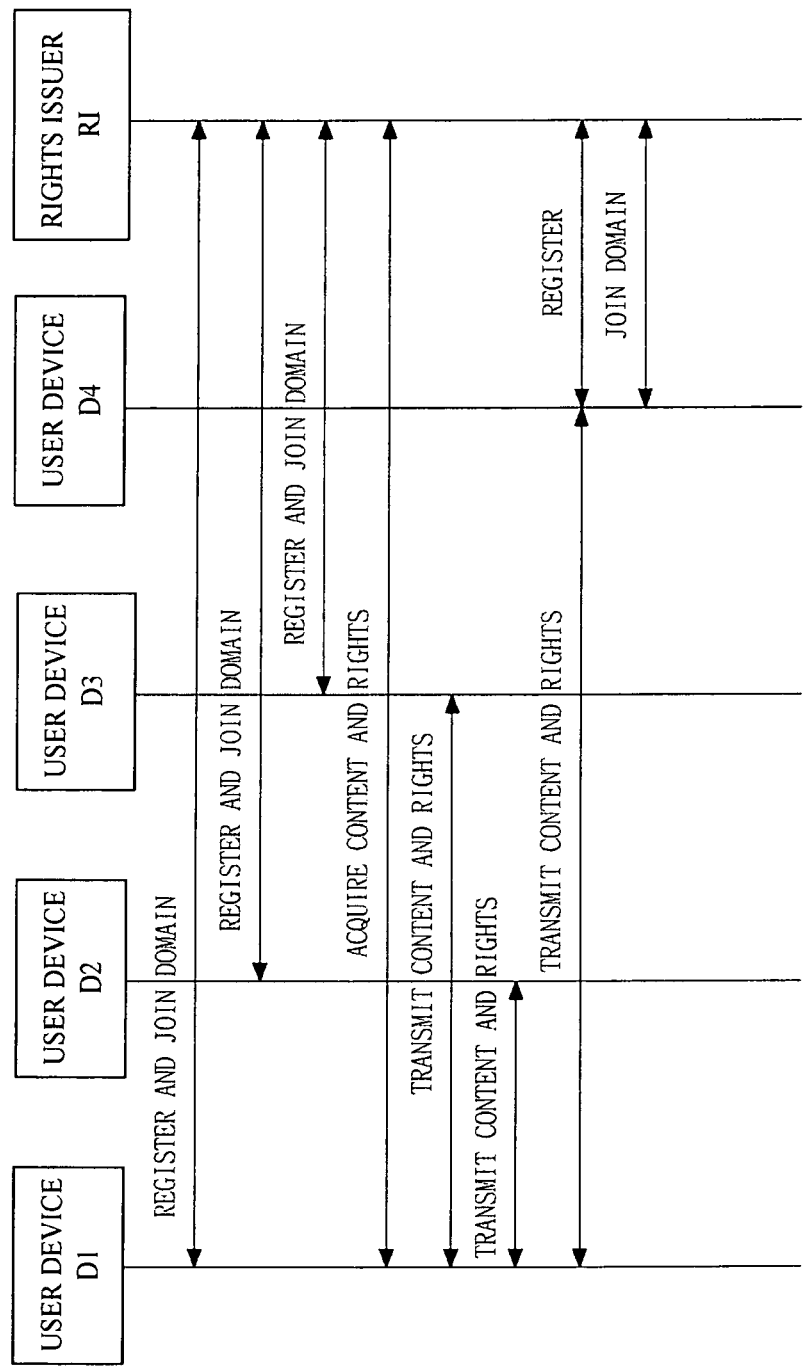
FIG. 2 is a diagram illustrating a method for allowing multiple user devices compatible with the OMA DRM Version 2.0 to use a domain rights object.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 3:
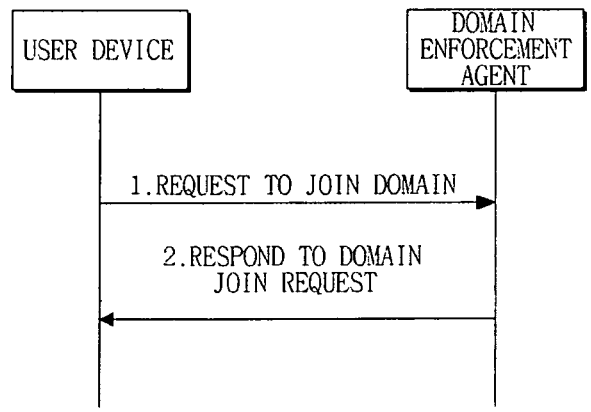
FIG. 3 is a diagram illustrating a procedure for requesting to join a user domain and responding to the user domain join request, according to an exemplary embodiment.

FIG. 3 is a diagram illustrating a procedure for requesting to join a user domain and for responding to the user domain join request, according to an exemplary embodiment. Referring to FIG. 3, a user device issues a request for joining a specific user domain to a DEA managing user domains, and the DEA that receives the domain join request message processes the domain join request message and generates a domain join response message to the domain join request message so that the user device can join the specific user domain.

In this specification, a new protocol is defined for exchanging a domain session key to set up a secure session between a user domain and a DEA and between user devices belonging to the same user domain if the user device joins a user domain.

Figure 9:
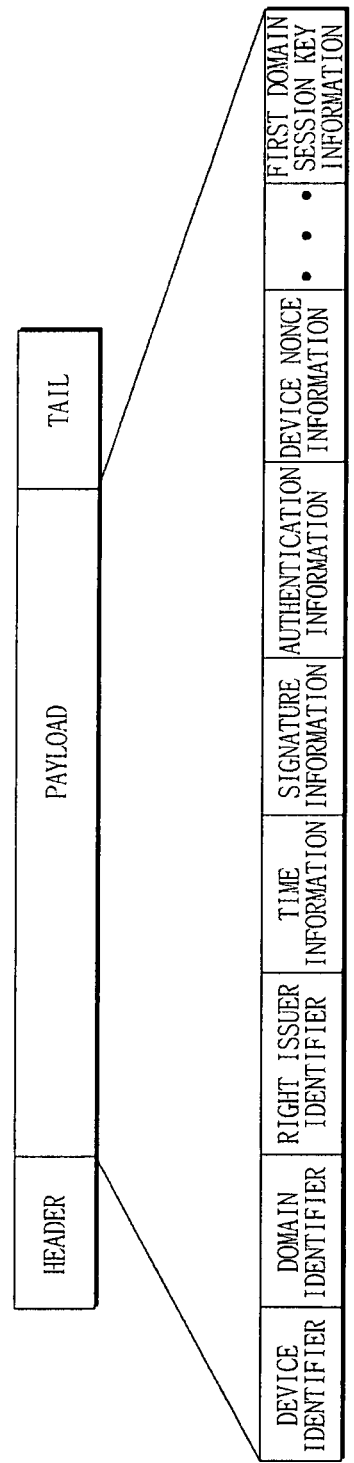
FIG. 9 shows an exemplary embodiment of a new protocol for generating a request message for joining a user domain, including a function of exchanging a domain session key.

FIG. 9 shows an exemplary embodiment of a new protocol for generating a request message for joining a user domain, including a function of exchanging a domain session key. As illustrated in FIG. 9, the request message for joining the user domain based on DRM may include a device identifier, a domain identifier, a rights issuer's identifier, time information, and a first domain session key.

Here, the device identifier is used to identify a user device, the domain identifier is used to identify a user domain that the user device wants to join, and the rights issuer's identifier is used to identify a rights issuer who has provided digital rights. The time information stores a time at which the user device has requested to join the user domain.

The first domain session key is a secret key for security, that is, for encryption to set up a secure session between the user device and the DEA and between user devices belonging to the same user domain. Here, the first domain session key may be used as a key value of a symmetric key algorithm, or as a seed for inducing the key value.

Meanwhile, the request message can further include signature information for non-repudiation.

Also, the request message can further include device nonce information storing an arbitrary value to avoid a replay attack.

Figure 10:
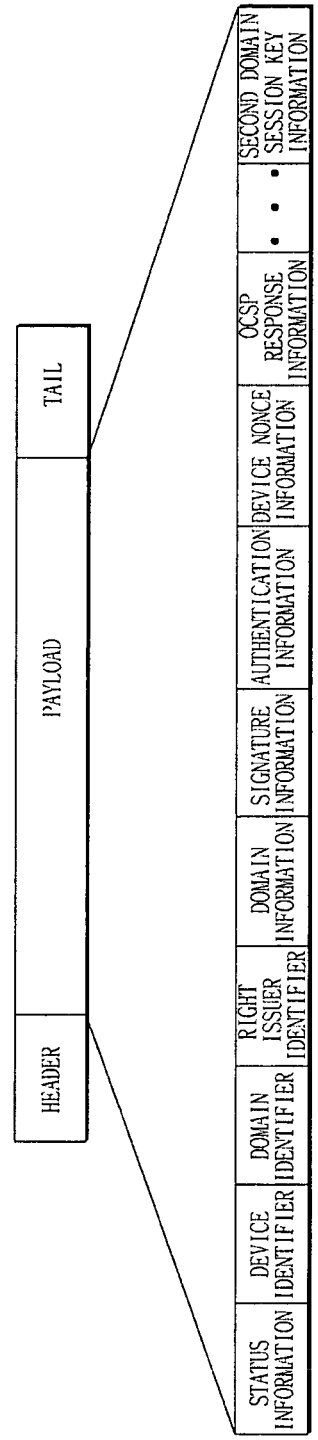
FIG. 10 shows an exemplary embodiment of a new protocol for generating a response message to a user domain join request message, including a function of exchanging a domain session key.

FIG. 10 shows an exemplary embodiment of a new protocol for generating a response message to a user domain join request message, including a function of exchanging a domain session key. As illustrated in FIG. 10, the response to the user domain join request based on DRM includes status information, a device identifier, a domain identifier, a rights issuer's identifier, domain information, and a second domain session key.

Here, the status information is the result of a determination on whether to allow a user device to join the identified user domain. If the status information is "Success", this means that the corresponding user device is allowed to join the user domain, and if the status information is not "Success", this means that the corresponding user device is not allowed to join the user domain. The device identifier is used to identify the user device. The domain identifier is used to identify the user domain that the user device has requested to join. The rights issuer's identifier is used to identify a rights issuer who has provided digital rights. The domain information is registration information of the user domain.

The second domain session key is a secret key for security, that is, for encryption to set up a secure session between the user device and a DEA and between user devices belonging to the same user domain. Particularly, the second domain session key may be used to acknowledge that a first domain session key for security has been received from the user device. The second domain session key can be used as a key value of a symmetric key algorithm, or as a seed for inducing the key value.

Meanwhile, the response can further include signature information for non-repudiation.

Also, the response can further include a certification chain for authentication.

Also, the response can further include device nonce information storing an arbitrary value to avoid a replay attack.

Also, the response can further include certification status information. The certification status information may be obtained by requesting it from an OCSP responder.

Figure 4:
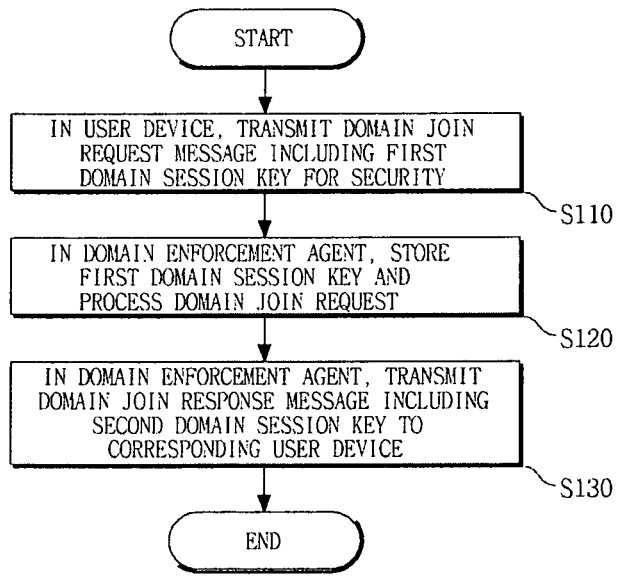
FIG. 4 is a flowchart illustrating a method for joining a user domain based on DRM, according to an exemplary embodiment.

FIG. 4 is a flowchart illustrating a method for joining a user domain based on DRM, according to an exemplary embodiment. FIG. 4 shows a procedure in which a user device and a DEA exchange the protocols shown in FIG. 9 and FIG. 10 when the user device joins a user domain based on DRM.

First, the user device transmits a request message for joining the user domain, including a first domain session key for security, to the DEA (operation S110). Here, the request message can further include a device identifier for identifying the user device, and a domain identifier for identifying a user domain that the user device wants to join.

Then, the DEA, which receives the request message from the user device, stores the first domain session key, and processes the request message (operation S120). The processing on the request message may be to determine whether to allow the user device to join the user domain.

If the processing on the request message is complete, the DEA transmits a response to the request message, including a second domain session key, to the corresponding user device (operation S130). The response includes the result of the determination on whether to allow the user device to join the user domain.

The first domain session key and the second domain session key are used for security, that is, for encryption to set up a secure session between the user device and the DEA and between user devices belonging to the same user domain. In the current embodiment, the first domain session key and the second domain session key are exchanged and shared between the user device and DEA when the user device issues the request message for joining the user domain and the DEA sends a response message in response to the request message based on DRM.

In more detail, the first domain session key is a secret key for security between the user device and DEA, and is stored in both the user device and DEA.

The second domain session key may be used to acknowledge that the DEA has successfully received the first domain session key. The second domain session key has a value corresponding to the first domain session key. A corresponding relationship between the second domain session key and the first domain session key can be implemented in one or more various ways.

According to an exemplary embodiment, the DEA transmits a value (for example, A) which is equal to the first domain session key value, as the second domain session key value, to the user device. At this time, the first domain session key can be used as a key value of a symmetric key algorithm for security, or as a seed for inducing the key value.

According to another exemplary embodiment, the DEA transmits a value obtained by transforming the first domain session key value, as the second domain session key value to the user device. Likewise, the value (for example, a value obtained by applying a one-way function to the first domain session key value) obtained by transforming the first domain session key value can be used as a key value of a symmetric key algorithm, or as a seed for inducing the key value.

According to still another exemplary embodiment, the DEA transmits a predetermined value (for example, B), as the second domain session key value, to the user device. In this case, the user device can create a new value using the first domain session key value and the predetermined value received from the DEA, and use the new value as a key value of a symmetric key algorithm, or as a seed for inducing the key value.

For example, the user device receives the predetermined value B from the DEA, and creates a new value (for example, f(A, B)) using the first domain session key value A and the predetermined value B. The user device may use the new value as a key value of a symmetric key algorithm, or as a seed for inducing the key value. Alternatively, the DEA may create a new value (for example, f(A, B)) using the first domain session key value A and the predetermined value B, and transmits the new value f(A,B) as the second domain session key value to the user device. The new value f(A, B) can be used as a key value of a symmetric key algorithm for security, or as a seed for inducing the key value.

The first domain session key value A, the second domain session key B, or the new value f(A, B)) obtained using the first domain session key A and the predetermined value B can be used as a key value of a symmetric key algorithm, or as a seed for inducing the key value.

However, the above-described embodiments are exemplary, and can be modified in various ways.

Accordingly, by encrypting or decrypting information transmitted between the user device and the DEA and between user devices belonging to the same user domain, using the first domain session key A, the second domain session key B, or the new value f(A, B)) obtained using the first domain session key A and the predetermined value B, a secure session between the user device and the DEA and between the user devices belonging to the same user domain can be created. Accordingly, communications security can be better ensured in the DRM environment.

Figure 5:
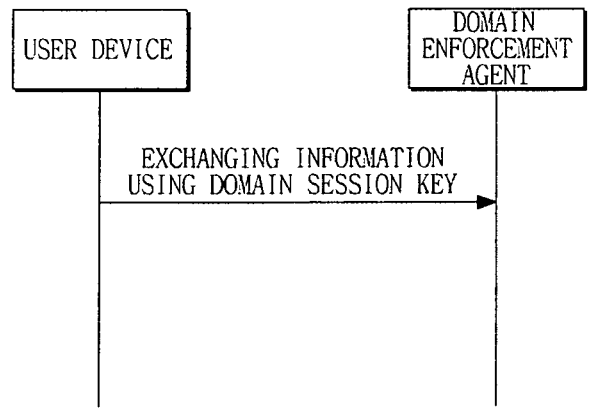
FIG. 5 is a diagram illustrating a procedure for exchanging information between a user device and a domain enforcement agent, according to an exemplary embodiment.

FIG. 5 is a diagram illustrating a procedure for exchanging information between a user device and a DEA, according to an exemplary embodiment. Through the procedure of joining the user domain, as described above with reference to FIG. 3 and FIG. 4, domain session keys are exchanged and shared as secret keys between the user device and DEA before information exchange occurs between the user device and DEA. Information to be exchanged between the user device and DEA is encrypted using the domain session keys shared between the user device and DEA, and then transmitted, and accordingly the received information can be decrypted using the domain session keys.

That is, when information exchange occurs between the user device and DEA in the DRM environment, the user device or DEA, which has completed the domain join procedure, can encrypt information that is to be transmitted using the domain session key information shared by the user device and DEA, and transmit the encrypted information. The user device or DEA, which has received the encrypted information, can decrypt the encrypted information using the domain session key information. The domain session key may be the first domain session key, the second domain session key, or a new value obtained using the first and second domain session keys.

Accordingly, since other members except for the user device and DEA are not aware of the domain session key information shared between the user device and DEA through the domain join procedure, the security of information transmitted between the user device and DEA can be better ensured.

Figure 6:
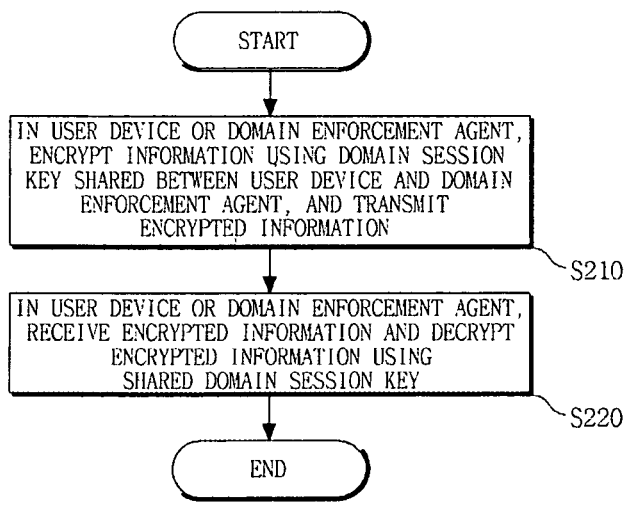
FIG. 6 is a flowchart illustrating a method for exchanging information between a user device and a domain enforcement agent (DEA), according to an exemplary embodiment.

FIG. 6 is a flowchart illustrating a method for exchanging information between a user device and a DEA, according to an exemplary embodiment. More specifically, FIG. 6 shows a procedure for encrypting and decrypting information using the domain session keys exchanged between the user device and DEA through the protocols shown in FIG. 9 and FIG. 10.

First, the user device or DEA encrypts information that is to be transmitted using shared domain session keys (operation S210). Here, the domain session keys have been shared in advance between the user device and DEA when a domain join request is processed between the user device and DEA. The domain session keys can include a first domain session key included in a domain join request message (see FIG. 9) transmitted from the user device to the DEA, and a second domain session key included in a response to the domain join request message, transmitted from the DEA to the user device.

The first domain session key is a secret key for security between the user device and DEA, and stored in both the user device and DEA. The second domain session key may be used to acknowledge that the DEA has successfully received the first domain session key, and may have a value corresponding to the first domain session key.

Accordingly, the user device or DEA encrypts information using the domain session keys, and then transmits the encrypted information, thereby more safely exchanging information.

Meanwhile, either the user device or DEA receives the encrypted information, and decrypts the received information using the shared domain session keys (operation S220). Each domain session key can be used as a key value of a symmetric key algorithm for security, or as a seed for inducing the key value. Or, one of the first domain session key, the second domain session key, and a new value obtained by transforming the first domain session key or second domain session key may be shared between the user device and the DEA.

Accordingly, since information exchanged between the user device and DEA is encrypted before transmission and decrypted after receipt, using the domain session keys exchanged and shared in advance between the user device and DEA when the user device requests to join a domain and the DEA responds to the request, a secure session is set up between the user device and DEA, thereby better ensuring communications security based on the DRM.

Figure 7:
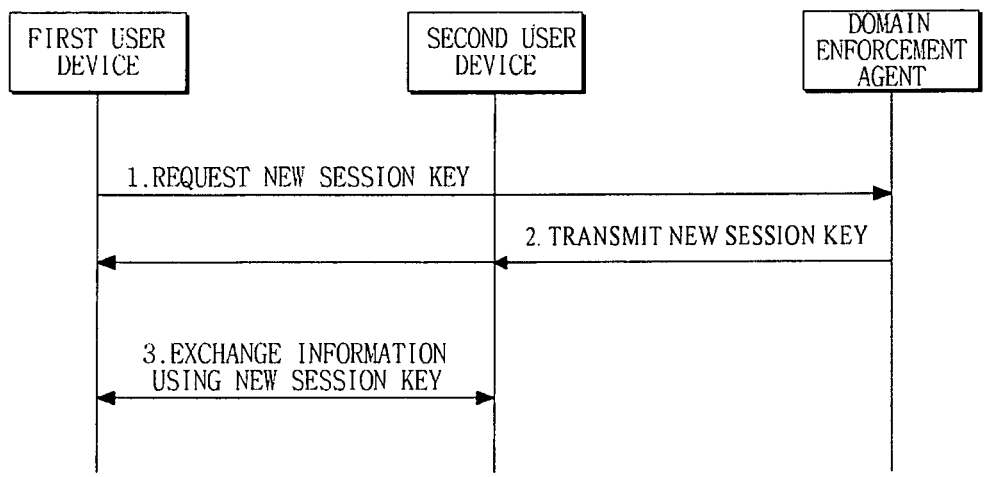
FIG. 7 is a diagram illustrating a procedure for exchanging information between two user devices belonging to the same user domain, according to an exemplary embodiment.

FIG. 7 is a diagram illustrating a procedure for exchanging information between two user devices (hereinafter, referred to as a first user device and a second user device) each belonging to the same user domain, according to an exemplary embodiment. Referring to FIG. 7, domain session keys are exchanged between the first user device and a DEA, through the domain join procedure described above with reference to FIG. 3 and FIG. 4, and the first user device and DEA share the domain session keys as secret keys prior to information exchange. In the case where the first user device and the second user device, each belonging to the same user domain, try to exchange information, a new session key that is different from the domain session keys is requested, and information is exchanged using the new session key.

That is, by encrypting and decrypting information using a new session key available only to the first user device and the second user device, the security of the information transmitted between the first user device and the second user device can be better ensured.

For example, the first user device encrypts a message for requesting a new session key using a domain session key shared with the DEA through the above-described domain join procedure, and transmits the encrypted message to the DEA. The DEA decrypts the received message using the shared domain session key, recognizes that a new domain session key is requested, and transmits a new domain session key to both the first user device and the second user device. The first user device and the second user device receive the new domain session key, and exchange information through encryption and decryption using the new domain session key. Accordingly, the security of information transmitted between the first user device and the second user device belonging to the same domain can be better ensured.

The new domain session key can be used as a key value of a symmetric key algorithm for security, and also as a seed for inducing the key value.

Figure 8:
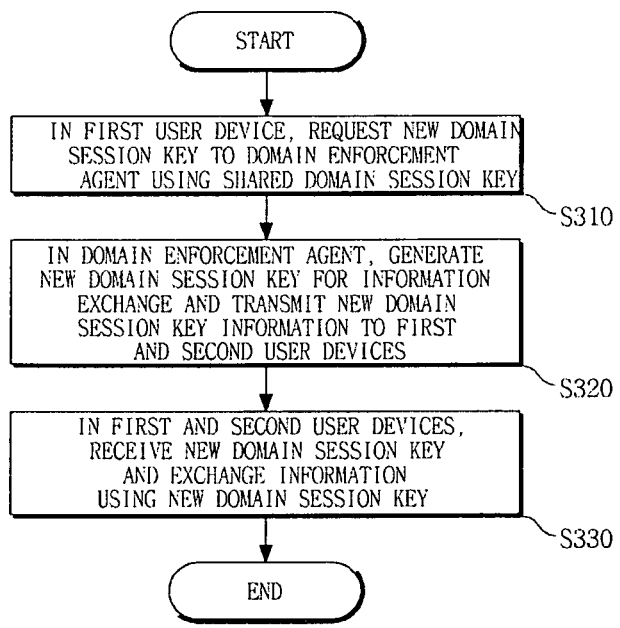
FIG. 8 is a flowchart illustrating a method for exchanging information between two user devices belonging to the same user domain, according to an exemplary embodiment.

FIG. 8 is a flowchart illustrating a method for exchanging information between two user devices (hereinafter, referred to as a first user device and a second user device) belonging to the same user domain, according to an exemplary embodiment. In the current embodiment, two user devices, each belonging to the same user domain, exchange information through encryption and decryption using a new session key.

First, the first user device, which has joined the user domain and shared a domain session key with a DEA, designates the second user device with which information will be exchanged, and requests the DEA to send a new session key (operation S310). Here, a request message used for the request can include a device identifier of the second user device belonging to the same user domain as the first user device.

Then, the DEA generates a new domain session key used for information exchange between the first user device and the second user device, and transmits the new domain session key to both the first user device and the second user device (operation S320).

The first user device and the second user device exchange information through encryption and decryption using the new domain session key (operation S330).

Accordingly, since the new domain session key is known only to the first user device and the second user device and not known to other members of the user domain, the security of information transmitted between the first user device and the second user device can be better ensured.

As described above, since a domain session key is shared between a user device and a DEA or between two user devices belonging to the same user domain so that a secure session is set up, communications security can be better ensured based on DRM.

An information security method based on DRM according to the exemplary embodiments of the present invention can be applied to information security technologies and applications thereof.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for joining a user domain based on digital rights management (DRM), comprising:
    in a user device, transmitting a domain join request message including a first domain session key to a domain enforcement agent managing the user domain; and
    receiving a domain join response message from the domain enforcement agent in response to the domain join request message, the domain join response message including a second domain session key,
    wherein a new domain session key different from the second domain session key is requested from the domain enforcement agent, and the new domain session key allows the user device to share encrypted information with another user device, the new domain session key comprising a key value obtained by using the first domain session key and the second domain session key.

2. The method of claim 1, wherein the first domain session key is stored in both the user device and the domain enforcement agent.

3. The method of claim 1, wherein the second domain session key has a value corresponding to a value of the first domain session key.

4. The method of claim 3, wherein the second domain session key has a value that is the same as the value of the first domain session key.

5. The method of claim 3, wherein the second domain session key has a value obtained by transforming the value of the first domain session key.

6. The method of claim 3, wherein the second domain session key has a predetermined value set by the domain enforcement agent.

7. The method of claim 3, wherein the second domain session key has a value obtained by using the first domain session key and a predetermined value set by the domain enforcement agent.

8. The method of claim 3, wherein the first domain session key, the second domain session key, or a value obtained by using the first domain session key and the second domain session key is used as a key value of a symmetric key algorithm, or as a seed to induce the key value.

9. The method of claim 1, wherein the domain join request message further includes a device identifier to identify the user device, and a domain identifier to identify the user domain that the user device wants to join.

10. The method of claim 1, wherein the domain join response message further includes a device identifier to identify the user device, a domain identifier to identify the user domain that the user device wants to join, and status information regarding a determination on whether to allow the user device to join the user domain.

11. The method of claim 1, wherein the other user device is a mobile device.

12. A method for sharing information in a user domain based on digital rights management (DRM), comprising:
    in a user device, transmitting a domain join request message including a first domain session key to a domain enforcement agent managing the user domain;
    receiving a domain join response message from the domain enforcement agent in response to the domain join request message, the domain join response message including a second domain session key;
    requesting from the domain enforcement agent a new domain session key different from the second domain session key; and
    transmitting information to another user device in the user domain using the new domain session key,
    wherein the new domain session key allows the user device to share encrypted information with the other user device, the new domain session key comprising a key value obtained by using the first domain session key and the second domain session key.

13. The method of claim 12, wherein the second domain session key comprises certification status information obtained by requesting the certification status information from an Online Certificate Status Protocol (OCSP) responder.

* * * * *